US011841427B2

(12) United States Patent
Nagareda et al.

(10) Patent No.: US 11,841,427 B2
(45) Date of Patent: Dec. 12, 2023

(54) ULTRASONIC-WAVE TRANSMITTER/RECEIVER

(71) Applicant: HONDA ELECTRONICS CO., LTD., Aichi (JP)

(72) Inventors: Kenji Nagareda, Aichi (JP); Shuichi Sano, Aichi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 17/044,352

(22) PCT Filed: Nov. 28, 2019

(86) PCT No.: PCT/JP2019/046516
§ 371 (c)(1),
(2) Date: Oct. 1, 2020

(87) PCT Pub. No.: WO2021/106138
PCT Pub. Date: Jun. 3, 2021

(65) Prior Publication Data
US 2023/0123597 A1    Apr. 20, 2023

(51) Int. Cl.
*G01S 15/96* (2006.01)
*G10K 11/00* (2006.01)

(52) U.S. Cl.
CPC ............ *G01S 15/96* (2013.01); *G10K 11/006* (2013.01)

(58) Field of Classification Search
CPC .................. G01S 15/96; G10K 11/006
See application file for complete search history.

(56) References Cited

U.S. PATENT DOCUMENTS

| 5,331,760 | A | * | 7/1994 | DuMont | ................ | A01K 93/02 43/17.1 |
| 5,743,855 | A | * | 4/1998 | Hanafy | ................ | B06B 1/0622 600/459 |
| 5,887,376 | A | * | 3/1999 | Currier | ................ | G01S 15/96 367/173 |
| 2004/0074294 | A1 | * | 4/2004 | Boucher | ................ | G01S 7/521 73/187 |
| 2006/0050615 | A1 | * | 3/2006 | Swisher | ................ | G01S 7/521 367/173 |

(Continued)

FOREIGN PATENT DOCUMENTS

| CN | 207914086 | 9/2018 |
| JP | 54-155568 | 10/1979 |

(Continued)

*Primary Examiner* — Ian J Lobo
(74) *Attorney, Agent, or Firm* — Clark & Brody LP

(57) ABSTRACT

The objective of this invention is to provide an ultrasonic-wave transmitter/receiver fish-finder that stabilizes its balanced state while in water to transmit ultrasonic waves vertically downward, thus improving detection accuracy. The ultrasonic-wave transmitter/receiver 10 includes an ultrasonic transducer 21 that transmits and receives ultrasonic waves; a hanging-bell shaped case 50 that houses the ultrasonic transducer 21; and a cable 40 that suspends the case 50. A weight 81 is arranged above the ultrasonic transducer 21 provided at the bottom 54 of the case 50. In addition, the filler A1 is filled into the case 50 such that a cavity A2 is secured in the upper region of the case 50.

9 Claims, 9 Drawing Sheets

(56) References Cited

U.S. PATENT DOCUMENTS

| | | | | |
|---|---|---|---|---|
| 2007/0163350 A1* | 7/2007 | Nakano | ............... | G01S 7/521 73/643 |
| 2009/0278005 A1* | 11/2009 | Bacarella | ............ | A01K 97/00 248/205.1 |
| 2016/0274236 A1* | 9/2016 | Iida | ............... | G01S 7/6272 |
| 2018/0190255 A1* | 7/2018 | Dmitriev | ............... | G01S 1/72 |

FOREIGN PATENT DOCUMENTS

| | | | | |
|---|---|---|---|---|
| JP | 56-56290 | | 5/1981 | |
| JP | 61-292500 | | 12/1986 | |
| JP | 62-97976 | | 6/1987 | |
| JP | H10174189 A | * | 6/1998 | ........ G10K 11/006 |
| JP | 2001-166056 | | 6/2001 | |
| SU | 1566282 A1 | * | 4/1988 | |
| WO | 02/047432 | | 6/2002 | |
| WO | 2014/002286 | | 1/2014 | |

* cited by examiner

ULTRASONIC-WAVE TRANSMITTER/RECEIVER

TECHNICAL FIELD

This invention relates to an ultrasonic-wave transmitter/receiver for a fish-finder that detects schools of fish using ultrasonic waves.

TECHNICAL BACKGROUND

There is a conventionally known ultrasonic-wave transmitter/receiver such that the case holding the ultrasonic transducer of such transmitter/receiver is suspended by a cable for signal transmission and is dropped into the water so that the ultrasonic transducer transmits and receives ultrasonic waves, thus detecting any school of fish present, (e.g. see Patent Documents 1). This ultrasonic-wave transmitter/receiver is used e.g. for ice fishing such as lake-smelt fishing. The case of the ultrasonic-wave transmitter/receiver is to be inserted into the water through a hole made in the ice when ice fishing.

PRIOR ART

Patent Document
Patent Document 1: Japanese published unexamined patent application No. 2001-166056 (Paragraph [0006], FIG. 1, FIG. 2, etc.)

DISCLOSURE OF THE INVENTION

Problems to be Resolved by the Invention

By the way, to improve the detection accuracy of the ultrasonic-wave transmitter/receiver, it is preferable to emit (transmit) ultrasonic waves vertically downward, with the acoustic-radiation surface of the ultrasonic transducer held horizontally. Conventionally, such an acoustic-radiation surface is kept horizontal by the weight of the ultrasonic transducer. However, in the case that there is a great deviation between the center of the case and the center of gravity of the ultrasonic transducer, the ultrasonic-wave transmitter/receiver is tilted into the water, and the acoustic radiation surface is also tilted, so that the direction of the ultrasonic waves being emitted (central axis of the acoustic pressure) is inclined with respect to the vertical direction. In this case, a school of fish cannot be detected accurately, causing the problem of an error occurring on the display of the fish-finder.

This invention has been achieved in light of the above-referenced problems. The purpose thereof such invention is to provide an ultrasonic-wave transmitter/receiver capable of stabilizing the balanced state of the ultrasonic-wave transmitter/receiver in water so that the ultrasonic waves are transmitted vertically downward, thus improving the detection accuracy.

Means for Solving the Problems

To solve the above problems, the first aspect of this invention refers to an ultrasonic-wave transmitter/receiver for a fish-finder, comprising: an ultrasonic transducer for transmitting and receiving ultrasonic waves; a hanging-bell shaped case for housing such ultrasonic transducer; and a cable for suspending the case, characterized in that a weight is placed on the upper side of the ultrasonic transducer that is located at the bottom inside the case, and therein such case a filler is filled so as to leave a cavity at the upper region inside the case.

Therefore, according to the first aspect of this invention, placing the weight on the upper side of the ultrasonic transducer inside the case makes the ultrasonic-wave transmitter/receiver moderately heavy, thus making it harder to swing while being suspended by the cable, thus stabilizing the balanced state of the ultrasonic transducer in the water. In addition, the filler is not filled into the whole case, but is filled so as to leave a cavity at the upper region inside the case, that lowers the center of gravity of the ultrasonic transducer, thus realizing a more balanced state of the ultrasonic-wave transmitter/receiver in the water. As such, the acoustic-radiation surface of the ultrasonic transducer becomes horizontal, and the ultrasonic waves can be transmitted vertically downward, thus making it possible to improve the detection accuracy of the ultrasonic-wave transmitter/receiver.

A second aspect of this invention refers to an ultrasonic-wave transmitter/receiver according to the first aspect of this invention, characterized in that the weight of a substantially truncated-cone shape includes a cable-insertion hole for inserting a cable at the center of the weight.

Therefore, according to the second aspect of this invention, since the weight is of a substantially truncated cone shape, a space is likely to be formed above the weight in the case as compared to the case where the weight is of a substantially conical shape, thus making it easier to lower the center of gravity of the ultrasonic-wave transmitter/receiver. Further, since the weight according to the second aspect of this invention has rotational symmetry, the center of gravity of the weight is likely to align with the center of the case, that is likely to prevent the ultrasonic-wave transmitter/receiver from being tilted. As a result, the balanced state of the ultrasonic-wave transmitter/receiver in water can be easily stabilized, and the acoustic-radiation surface of the ultrasonic transducer becomes horizontal, thus making it easy to improve the detection accuracy of the ultrasonic-wave transmitter/receiver. Further, since the weight is of a substantially truncated-cone shape that does not fill the space above the weight within the case, the weight of the whole ultrasonic-wave transmitter/receiver can be reduced. Therefore, even if the weight is housed in the case, the load upon the cable can be minimized. Further, since the weight is of a substantially truncated-cone shape, the weight can be easily housed in the hanging-bell shaped case.

The third aspect of this invention refers to an ultrasonic-wave transmitter/receiver according to the second aspect of this invention, characterized in that the filler is filled into the cable-insertion hole through which the cable is inserted.

Therefore, according to the third aspect of this invention, once the filler that is filled into the clearance between the inner-wall surface of the cable-insertion hole and the outer-peripheral surface of the cable is cured, the cable can be fastened firmly onto the weight having a cable-insertion hole.

A fourth aspect of this invention refers to an ultrasonic-wave transmitter/receiver according to any one of the first to third aspects of this invention, characterized in that a concave part, on which the wiring included in the cable can be arranged, is formed on the bottom surface of the weight.

Therefore, according to the fourth aspect of this invention, arranging the wiring in the concave part formed on the bottom surface of the weight can prevent the problem of the weight pressing upon the wiring and being tilted. As a result, the balanced state of the ultrasonic-wave transmitter/receiver in the water is reliably stabilized, and the acoustic radiation surface of the ultrasonic transducer is surely horizontal, thus making it possible surely to transmit the ultrasonic waves vertically downward.

A fifth aspect of this invention refers to an ultrasonic-wave transmitter/receiver according to the fourth aspect of this invention, characterized in that a plurality of concave parts radially extend from the center of the weight.

Therefore, according to the fifth aspect of this invention, since the concave part extends radially from the center of the weight, it makes it easy to align the center of gravity of the weight with the center of the weight. As such, the weight is less likely to tilt, thus making it possible to stabilize the balanced state of the ultrasonic-wave transmitter/receiver properly in the water. Further, the weight has a plurality of concave parts, and even if a plurality of wiring exists, as well, all of such wiring can be arranged in the concave part.

A sixth aspect of this invention refers to an ultrasonic-wave transmitter/receiver according to the fourth or fifth aspect of this invention, characterized in that the wiring is arranged in the concave part, and that the filler is filled into the concave part in which the wiring is arranged.

Therefore, according to the sixth aspect of this invention, the filler is filled into the clearance between the inner surface of the concave part and the outer-peripheral surface of the wiring arranged in the concave part. As such, once the filler is cured, the wiring can be firmly fastened onto the weight having the concave part. Further, the weight and the ultrasonic transducer provided on the lower side of the weight can be firmly fastened to each other via the filler filled into the concave part.

A seventh aspect of this invention refers to an ultrasonic-wave transmitter/receiver according to any one of the first to sixth aspects of this invention, characterized in that the case comprises: an upper case that is open at the lower end, with the outer diameter being gradually reduced toward the upper end; and a lower case that is open at the upper end, with the bottom and side wall integrally formed into a concave cross-section, therein the ultrasonic transducer is housed in the lower case, the weight is housed in an opening section of the upper case, and an upper-end surface of the filler is located above the lower end of the upper case.

Therefore, according to the seventh aspect of this invention, since the upper-end surface of the filler is located above the lower end of the upper case, a joining area between the upper case and the lower case is covered with the filler that is filled into the case. As a result, the filler prevents water from entering the case through the joint, thus improving the waterproof performance of the case. In addition, once the filler is cured, the upper case and the lower case can be firmly joined.

The eighth aspect of this invention refers to an ultrasonic-wave transmitter/receiver according to the seventh aspect of this invention, characterized in that the upper-end surface of the filler is located at a height of half or less of the height of the upper surface of the ultrasonic transducer to the top of the inner wall of the upper case.

Therefore, according to the eighth aspect of this invention, the upper-end surface of the filler is located at a height of half or less than the height of the upper surface of the ultrasonic transducer to the top of the inner wall of the upper case, thus surely making a cavity at the upper area in the case. As a result, the center of gravity of the ultrasonic-wave transmitter/receiver is lowered, thus further stabilizing the balanced state of the ultrasonic-wave transmitter/receiver in the water. Also, the filler is not fully filled into the whole case, thus making it easy to reduce the weight of the ultrasonic-wave transmitter/receiver. Furthermore, the filler can be filled into the clearance between the outer-peripheral surface of the weight arranged above the ultrasonic transducer and the inner wall of the upper case. In this case, the weight can be firmly fastened onto the upper case once the filler is cured.

A ninth aspect of this invention refers to an ultrasonic-wave transmitter/receiver according to the seventh or eighth aspect of this invention, characterized in that a positioning-concave part, extending in the thickness direction of the weight, is formed on the outer-peripheral surface of the weight, and a positioning-convex part is provided on the inner-peripheral surface of the upper case so as to be fitted with the positioning-concave part, and that the filler is filled into the clearance between the positioning-concave part and the positioning-convex part.

Therefore, according to the ninth aspect of this invention, the positioning-convex part provided on the inner-peripheral surface of the case engages the positioning-concave part formed on the outer-peripheral surface of the weight, so that the weight is correctly positioned and fastened at the right place. Moreover, since the filler is filled into the clearance between the positioning-concave part and the positioning-convex part, the weight can be reliably fastened once the filler is cured.

A tenth aspect of this invention refers to an ultrasonic-wave transmitter/receiver according to any one of the seventh to ninth aspects of this invention, characterized in that the inner wall of the lower case has a shape of which the inner diameter gradually decreases toward the bottom of the lower case, and therein the ultrasonic transducer that makes contact with the inner wall is guided to the center position of the lower case, thus being disposed on the bottom of the lower case.

Therefore, according to the tenth aspect of this invention, since the inner diameter of the lower case gradually decreases toward the bottom of the lower case, the ultrasonic transducer is guided into the center position of the lower case once the ultrasonic transducer is housed in the lower case, thus making it easy to get the ultrasonic transducer positioned.

An eleventh aspect of this invention refers to an ultrasonic-wave transmitter/receiver according to any one of the first to tenth aspects of this invention, characterized in that the ultrasonic transducer comprises a piezoelectric element having a plurality of cuts formed on its main-surface side, with the outer surface of the piezoelectric element being covered with the filler, and therein piezoelectric element the filler is filled into the plurality of cuts.

Therefore, according to the eleventh aspect of this invention, filling the filler into the plurality of cuts reinforces each of the plurality of oscillating parts arranged in the piezoelectric element via the cuts, thus making it possible to prevent the oscillating part from being cracked. As a result, the reliability of the ultrasonic transducer is improved.

A twelfth aspect of this invention refers to an ultrasonic-wave transmitter/receiver according to any one of the first to tenth aspects of this invention, characterized in that the ultrasonic transducer comprises a piezoelectric element having a plurality of cuts formed on its main-surface side, therein, the outer surface of the piezoelectric element is covered with the filler, on the other hand, the plurality of cuts are all void spaces.

Therefore, according to the twelfth aspect of this invention, the cuts are wholly a void space, and the filler is not filled into the cuts so that the filler will not hinder the deformation in the thickness direction of the plurality of oscillating parts arranged via the cuts of the piezoelectric element. As a result, it is possible to prevent sensitivity reduction of the ultrasonic transducer caused by the filling of the filler.

Effects of the Invention

As described above in detail, according to the first to twelfth aspects of this invention, stabilizing the balanced state of the ultrasonic-wave transmitter/receiver in the water enables the ultrasonic waves to be transmitted vertically downward, thus making it possible to improve detection accuracy.

DETAILED DESCRIPTION OF THE INVENTION

Hereinafter, the embodiments of this invention are described in detail with reference to the drawings.

Figure 1:
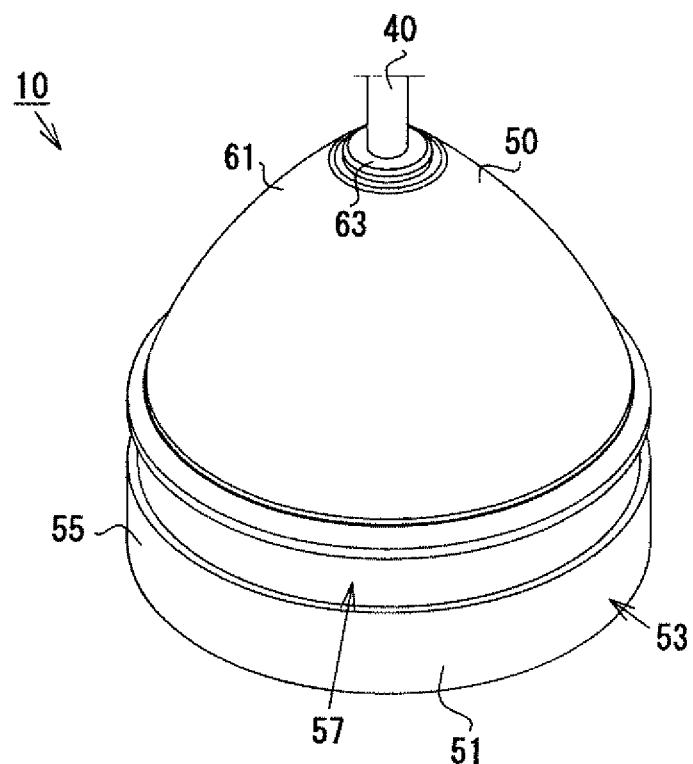
FIG. 1 is a perspective view of the ultrasonic-wave transmitter/receiver according to the embodiment of this invention.
Figure 2:
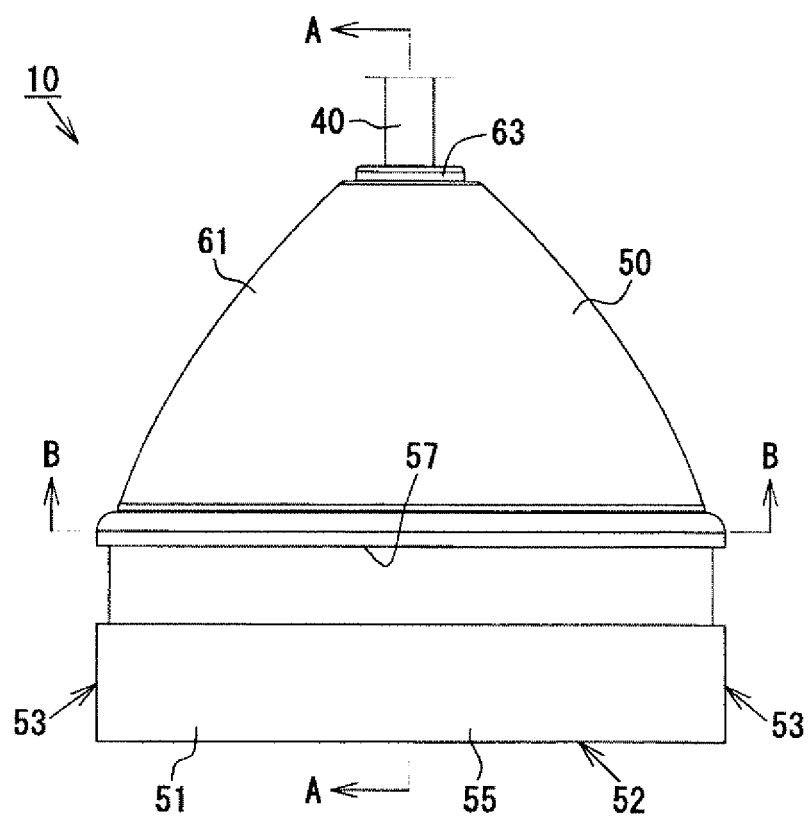
FIG. 2 is a side view of the ultrasonic-wave transmitter/receiver.
Figure 3:
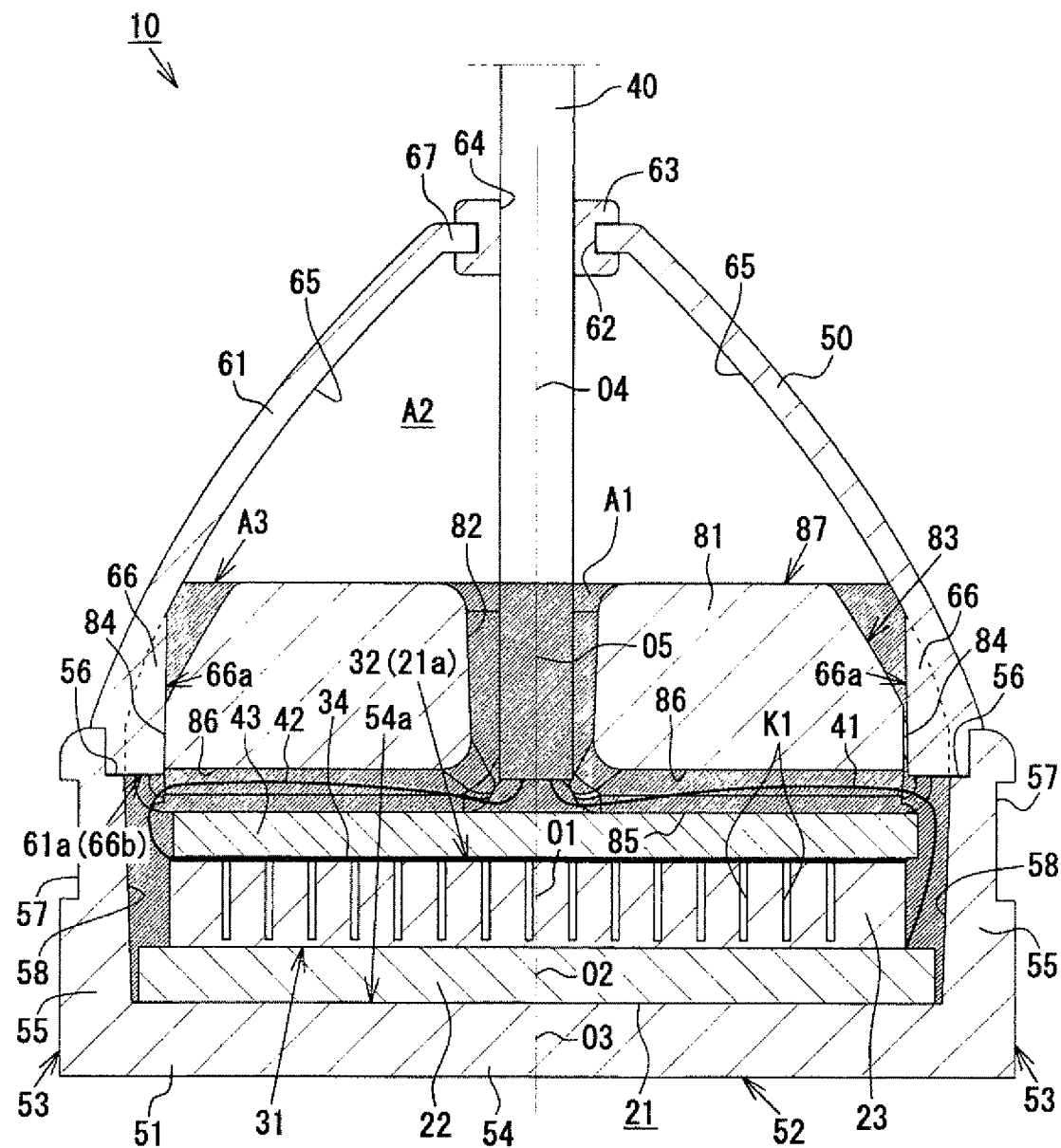
FIG. 3 is a sectional view of between the line A-A of FIG. 2.

As shown in FIGS. 1 to 3, the ultrasonic-wave transmitter/receiver 10 as the embodiment of this invention is a device for a fish-finder for detecting schools of fish present in water by emitting ultrasonic waves therein. The ultrasonic-wave transmitter/receiver 10 comprises an ultrasonic transducer 21 that transmits and receives ultrasonic waves; a case 50 that accommodates the ultrasonic transducer 21; and a cable 40 that suspends the case 50. The ultrasonic-wave transmitter/receiver 10 as the embodiment of this invention is used in the state of being suspended from the cable 40 in normal use.

As shown in FIGS. 1 to 4, the case 50 is of a hanging-bell shape and includes a lower case 51 that constitutes the lower-half part of the case 50 and an upper case 61 that constitutes the upper-half part of the case 50. The lower case 51 is made of an elastic body such as chloroprene rubber, neoprene rubber or polyurethane that also functions as an acoustic-matching layer, and has a bottom surface 52 and an outer-peripheral surface 53 perpendicular to the bottom surface 52. Further, the lower case 51 is a cylindrical case having a bottom that opens at the upper end, and has a concave cross-section with a bottom portion 54 and a side wall 55 that are integrally formed. The lower end of the upper case 61 is fitted in the lower case 51. A step surface 56 is formed at the upper-end side opening of the lower case 51, so that the opening end (lower end) of the upper case 61 that is fitted within the lower case 51 is brought into contact therewith.

A groove 57 is formed on the outer-peripheral surface 53 of the side wall 55 of the lower case 51. The groove 57 is used in a way different than normally used. Specifically, when the ultrasonic-wave transmitter/receiver 10 is attached to a boat (not shown in the drawings) for use, a fastening member (not shown in the drawings) such as a U-shaped bolt or a banding band or the like (not shown in the drawings) is fitted into the groove 57. The fastening member is fastened onto the ultrasonic-wave transmitter/receiver 10 to a holder (not shown in the drawings), and the holder is attached to the stern of the boat.

As shown in FIG. 3, the inner wall 58 of the lower case 51 is of a shape of which the inner diameter gradually decreases toward the bottom part 54. The ultrasonic transducer 21 is housed in the lower case 51. Specifically, the ultrasonic transducer 21 is disposed on the inner surface 54a of the bottom part 54 in the state thereof the ultrasonic transducer 21 is guided to the center position of the lower case 51 in abutting contact with the inner wall 58. The ultrasonic transducer 21 comprises a base material 22, which also functions as an acoustic-matching layer, and a piezoelectric element 23 that is joined to the base material 22. The amount of deviation between the central axis O1 of the piezoelectric element 23 and the central axis O2 of the base material 22 is 2% or less (0% for the embodiment of this invention) of the outer-diameter dimensions of the base material 22. Also, the amount of deviation between the central axis O3 of the lower case 51 and the central axis O2 of the base material 22 is 2% or less (0% for the embodiment of this invention) of the outer-diameter dimensions of the lower case 51.

The base material 22 is a disk-shaped plate-like resin member formed using glass epoxy (FR-4). In addition, the piezoelectric element 23 is, for example, a disk-shaped ceramic plate-like member formed by using lead-zirconate titanate (PZT) that is a piezoelectric ceramic. The piezoelectric element 23 has a front surface 31 and a rear surface 32 opposite the front surface 31. Further, a front-surface-side electrode (not shown in the drawings) is formed on the front surface 31 of the piezoelectric element 23, and a rear-surface-side electrode (not shown in the drawings) is formed on the rear surface 32 of the piezoelectric element 23. Also, according to the embodiment of this invention, the entire front surface 31 of the piezoelectric element 23 is joined to the base material 22 via the front-surface-side electrode and via the adhesive layer (not shown in the drawings). Then, the front surface 31 that is joined to the base material 22 functions as an acoustic-radiation surface for emitting (transmitting) the ultrasonic wave W1 when the piezoelectric element 23 oscillates in the radial direction.

Figure 4:
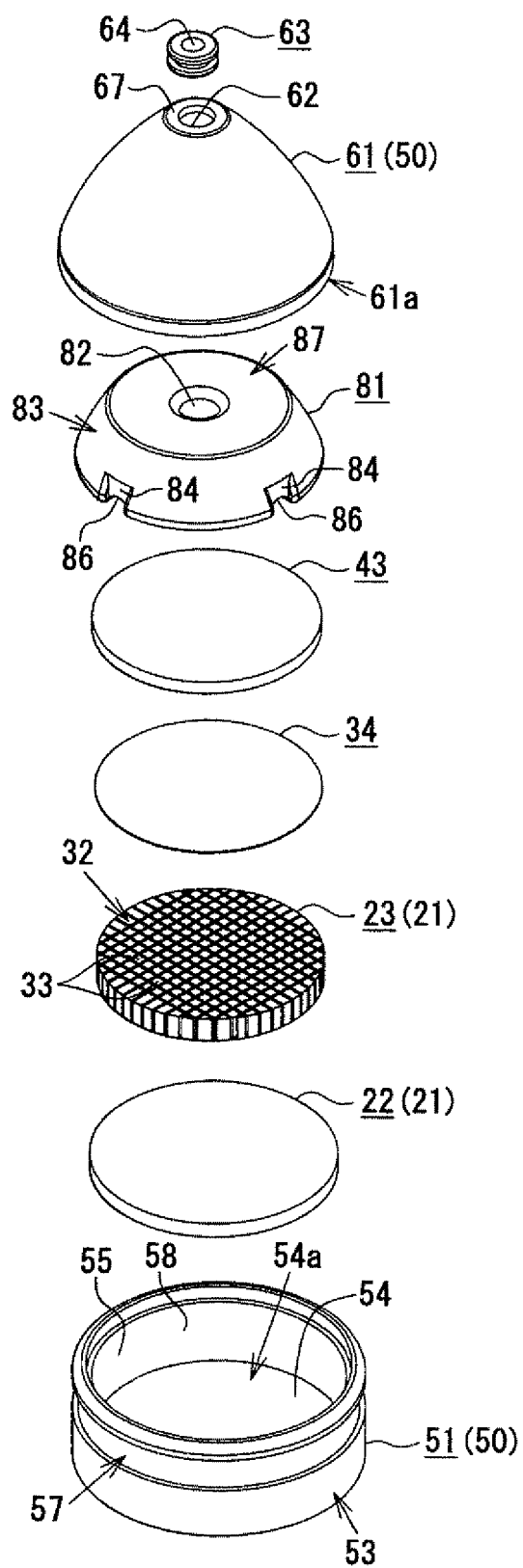
FIG. 4 is an exploded-perspective view of the ultrasonic-wave transmitter/receiver.
Figure 6:
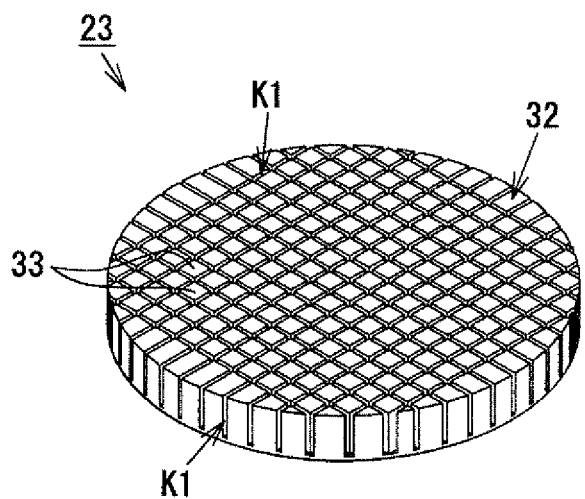
FIG. 6 is a perspective view of the piezoelectric element.
Figure 7:
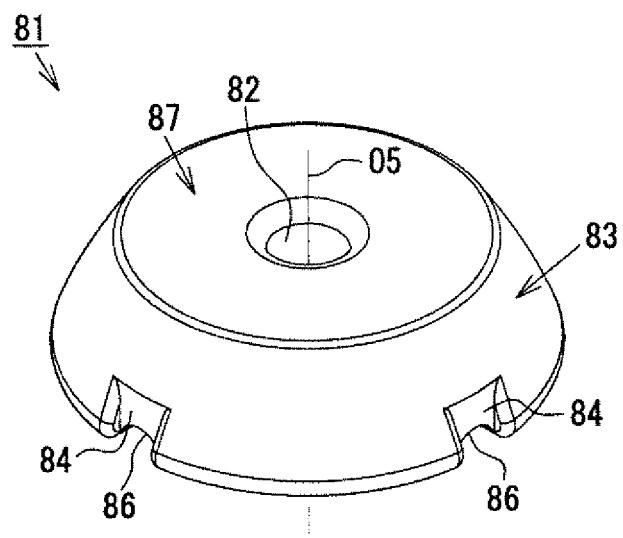
FIG. 7 is a perspective view of the weight.
Figure 8:
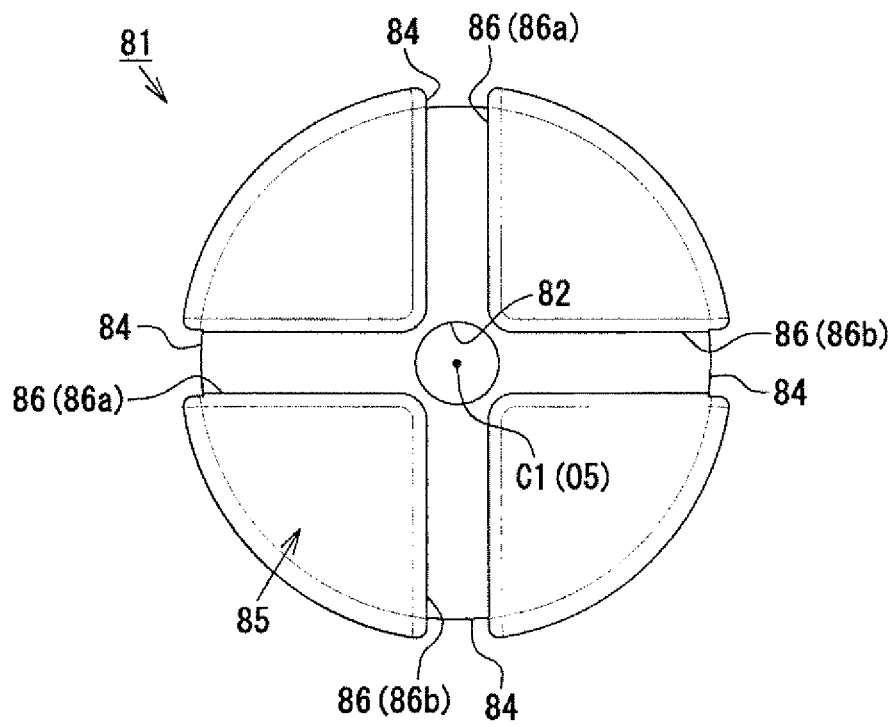
FIG. 8 is a bottom view of the weight.

As shown in FIGS. 3, 4, and 6, the piezoelectric element 23 is configured with a plurality of columnar oscillating parts 33 that are divided so as to extend in the thickness direction of the piezoelectric element 23. Each oscillating part 33 is configured by forming a plurality of cuts K1 extending in the vertical and horizontal directions on the rear surface 32 (main surface) side of the piezoelectric element 23. Also, each oscillating part 33 is connected to each other at the end of the front surface 31 of the piezoelectric element 23.

As shown in FIGS. 3 and 4, a copper foil 34 is attached to the entire rear surface 32 of the piezoelectric element 23 via a rear-surface-side electrode. The copper foil 34 of the embodiment of this invention contains a conventionally known conductive filler and is joined to the rear surface 32 via an adhesive (not shown in the drawings). Also, by attaching the copper foil 34 to the rear surface 32, such copper foil 34 becomes a common electrode on the tip surface of each oscillating part 33.

Then, as shown in FIG. 3, the first wiring 41 is connected to the front-surface-side electrode, and the second wiring 42 is connected to the copper foil 34. The first wiring 41 is connected to a side-surface terminal (not shown in the drawings) extending outward from the front-surface-side electrode by soldering or the like. The second wiring 42 is connected to the outer-peripheral part of the copper foil 34 by soldering or the like. Then, the first wiring 41 and the second wiring 42 are connected to the cable 40 by soldering, and the cable 40 is pulled out of the case 50 through the wiring-insertion hole 64 provided on the upper part of the case 50.

As shown in FIGS. 3 and 4, a sheet-shaped acoustic insulator 43 (backing material) is attached to the rear-side surface 32 of the piezoelectric element 23. The acoustic insulator 43 is for suppressing reverberation. As for the acoustic insulator 43, it is possible to use a resin material or rubber containing particles or fibers made of metal or ceramics or to use a resin material having pores dispersed therein (e.g. a sponge or the like).

As shown in FIGS. 1 to 5, the upper case 61 is open at the lower end 61a and has a structure of which the outer diameter gradually decreases toward the upper end. The upper case 61 is formed using a resin material such as ABS resin (acrylonitrile butadiene styrene resin) or PC resin (polycarbonate resin) that hardly deforms since it has very little elasticity. That is, the upper case 61 is made of a material harder than that (e.g. chloroprene rubber or the like) of the lower case 51. Further, a through-hole 62 is provided at the upper end of the upper case 61, and a bushing 63 made of chloroprene rubber or neoprene rubber or the like is fitted into the through-hole 62. The bushing 63, as described above, is of an annular shape having a wiring-insertion hole 64 in the center and has the function of fastening the cable 40 to be inserted through the wiring-insertion hole 64.

Figure 5:
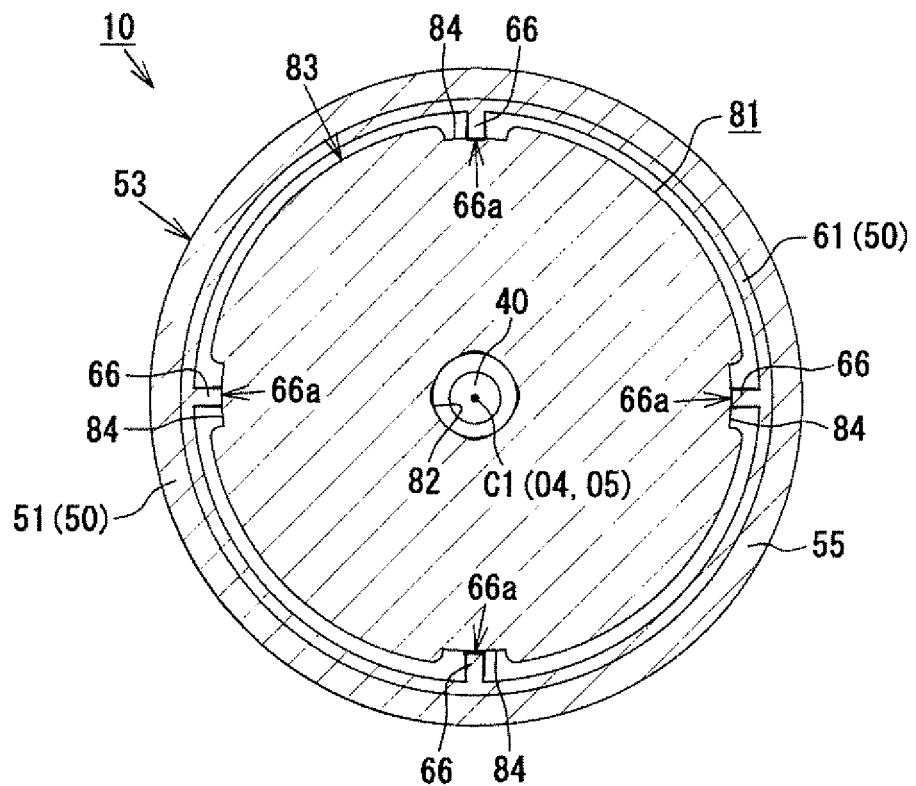
FIG. 5 is a sectional view of between line B-B of FIG. 2.

As shown in FIGS. 3 and 5, four positioning convex parts 66 are provided on the inner-peripheral surface 65 of the upper case 61. Each positioning convex part 66 is arranged at the lower end (opening) of the upper case 61 and is arranged at an equal angular interval (90 degrees interval) with reference to the central axis O4 of the upper case 61. Each positioning convex part 66 is of a plate shape and protrudes toward the central axis O4. Furthermore, as shown in FIG. 3, each positioning convex part 66 is of a substantially triangular shape when viewed from the circumferential direction of the upper case 61. The inner-end edge 66a of each positioning convex part 66 is arranged in parallel to the central axis O4. Also, the lower-end edge 66b of each positioning convex part 66 is located at the same height as the lower end 61a of the upper case 61.

As shown in FIGS. 3 to 5, 7, and 8, a weight 81 is housed in the opening of the upper case 61. The weight 81 is arranged above the ultrasonic transducer 21 that is arranged at the bottom part 54 in the lower case 51, with an acoustic insulator 43 interposed there between. The weight 81 has a function of immersing the case 50 under water and a function of adjusting the center of gravity so that the case 50 will not tilt while the case 50 is being suspended by the cable 40. Also, the weight 81 is made of a material having a large specific gravity such as zinc, lead, or the like and is of a flat, substantively truncated-cone shape having a cable insertion hole 82 in the center for inserting the cable 40. In other words, the height of the weight 81 is less than half the maximum diameter (outer diameter) of the weight 81. The amount of deviation between the center axis O5 of the weight 81 (cable insertion hole 82) and the center axis O1 of the piezoelectric element 23 is 2% or less (0% for the embodiment of this invention) of the outer-diameter dimension of the piezoelectric element 23. Also, most of the outer-peripheral surface 83 (the area excluding the lower-end part) of the weight 81 is an inclined surface. The inclination angle of the inclined surface with reference to the central axis O5 of the weight 81 is nearly equal to the inclination angle of the inner-peripheral surface 65 of the upper case 51 with reference to the central axis O4 of the upper case 51. Moreover, the thickness of the weight 81 is less than the outer diameter (maximum diameter) of the weight 81.

As shown in FIGS. 3 to 5, FIGS. 7 and 8, four positioning-concave parts 84 are formed on the outer-peripheral surface 83 of the weight 81. Each positioning-concave part 84 is arranged at the lower end of the weight 81 and are arranged at an equal angular interval (90 degrees interval) with reference to the center axis O5 of the weight 81. Also, each positioning-concave part 84 extends in the thickness direction of the weight 81 and opens at the outer-peripheral surface 83 and the bottom surface 85 of the weight 81. Further, each positioning-concave part 84 has a rounded opening. In addition, each positioning-convex part 66 on the upper-case side 61 is engaged in the center position of the positioning-concave part 84. At this time, the inner-end edge 66a of the positioning-convex part 66 is in contact with the bottom surface of the positioning-concave part 84. Also, the clearance between the positioning-concave part 84 and the positioning-convex part 66 in the completed state of the ultrasonic-wave transmitter/receiver 10 is 2% or less (0.5% for the embodiment of this invention) of the outer-diameter dimension of the piezoelectric element 23.

As shown in FIGS. 3, 4, 7 and 8, four concave parts, on which the first wiring 41 and second wiring 42 included in the cable 40 can be arranged, are formed on the bottom surface 85 of the weight 81. The width of each concave part 86 is greater than the outer diameter of the wirings 41 and 42, and the depth of each concave part 86 is also greater than the outer diameter of the wirings 41 and 42. Also, each one of the concave parts 86 is of the same length and extends radially from the center C1 of the weight 81 toward the outer peripheral side, and each one of the concave parts 86 is arranged at an equal angular interval (90 degrees interval) with reference to the center C1 of the weight 81. The weight 81 as the embodiment of this invention has rotational symmetry. The base end of each concave part 86 communicates with the cable insertion hole 82, and the tip of each concave part 86 communicates with the positioning-concave part 84.

As shown in FIG. 3, the case 50 is filled with a filler A1 made of a resin material (epoxy resin, urethane resin, silicone resin or the like) or an adhesive (two-component curing-type epoxy adhesive, rubber adhesive or the like). The filler A1 is filled into the case 50 such that a cavity A2 is to be secured in the upper region thereof. The thickness of the weight 81 as described above is less than the height of the cavity A2. The upper-end surface A3 of the filler A1 is located above the lower end 61a of the upper case 61, specifically, at the same height as the upper surface 87 of the weight 81. In other words, the upper-end surface A3 of the filler A1 is located at a height of half or less than the height from the upper surface 21a (specifically, the rear surface 32 of the piezoelectric element 23) of the ultrasonic transducer 21 to the inner surface of the top 67 (upper end) of the inner wall of the upper case 61. Also, a part of the filler A1 covers the outer surface of the piezoelectric element 23 and is filled into a void space (cut K1) between the oscillating parts 33 adjacent to each other in the piezoelectric element 23. Further, a part of the filler A1 is filled into the cable-insertion hole 82 of the weight 81 through which the cable 40 is inserted and is filled into the concave part 86 of the weight 81 in which the wirings 41 and 42 are arranged. A part of the filler A1 is also filled into the clearance between the positioning-concave part 84 of the weight 81 and the positioning-convex part 66 of the upper case 61.

Next, the electrical configuration of the ultrasonic-wave transmitter/receiver 10 is described.

Figure 9:
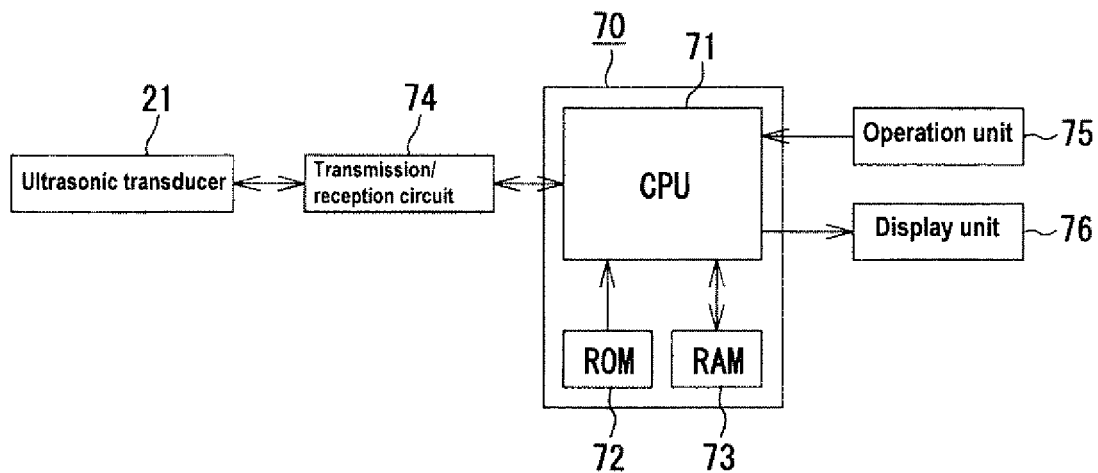
FIG. 9 is a block diagram of the electrical configuration of the ultrasonic-wave transmitter/receiver.

As shown in FIG. 9, the liquid-crystal monitor (not shown in the drawings) of the ultrasonic-wave transmitter/receiver 10 comprises a controller 70 that integrally controls the whole device. The controller 70 is configured with a well-known computer including a CPU 71, a ROM 72, a RAM 73 and the like.

The CPU 71 is electrically connected to the ultrasonic transducer 21 via a transmission/reception circuit 74. The transmission/reception circuit 74 outputs an oscillation signal to the ultrasonic transducer 21 to drive the ultrasonic transducer 21. As a result, the ultrasonic transducer 21 emits (transmits) ultrasonic waves into the water. In addition, an electrical signal indicating an ultrasonic wave (reflected wave) received by the ultrasonic transducer 21 is input to the transmission/reception circuit 74. Furthermore, the CPU 71 is electrically connected to the operation unit 75 and to the display unit 76 of the liquid-crystal monitor.

Then, the CPU 71, as shown in FIG. 9, controls the transmission/reception circuit 74 so that the ultrasonic waves are emitted from the ultrasonic transducer 21. The CPU 71 also receives, via the transmission/reception circuit 74, a reception signal generated at the time when the ultrasonic transducer 21 receives the reflected waves. Then, the CPU 71 generates the detected-image data based on the reception signal and stores such detected image data in the RAM 73. The CPU 71 takes control of the display unit 76 to show the detected image based on the detected-image data stored in the RAM 73.

Hereinafter, the method for using the ultrasonic-wave transmitter/receiver 10 is described.

The ultrasonic-wave transmitter/receiver 10 of the embodiment of this invention is used for ice fishing such as a lake-smelt fishing. In ice fishing, the case 50, which houses the ultrasonic transducer 21, is suspended by a cable 40 and immersed into the water. Then, fish finding is done by transmitting and receiving ultrasonic waves by the ultrasonic transducer 21. Specifically, firstly, switch on the power (not shown in the drawings) of the ultrasonic-wave transmitter/receiver 10 and of the liquid-crystal monitor. The liquid-crystal monitor, for example, is to be used while being held by an operator. Next, the CPU 71 of the controller 70 controls the ultrasonic transducer 21 to output an oscillation signal from the transmission/reception circuit 74 via the cable 40 so as to drive the ultrasonic transducer 21. At this time, the oscillating part 33 of the piezoelectric element 23 repeats contraction and extension in the thickness direction.

As a result, the piezoelectric element 23 oscillates, and ultrasonic waves are emitted (transmitted) from the ultrasonic transducer 21 into the water. Then, when the ultrasonic waves reach a school of fish or the bottom of a lake, the ultrasonic waves are reflected by the school of fish or the bottom of the lake to become reflected waves and are then propagated toward the ultrasonic-wave transmitter/receiver 10 and then input to (received by) the ultrasonic transducer 21. After that, the ultrasonic wave (reflected wave), received by the ultrasonic transducer 21, is converted into a reception signal and input to the CPU 71 via the cable 40 and via the transmission/reception circuit 74. The CPU 71 processes the information of the amplitude and time (timing) of the signal received from the series of transmissions and receptions and creates a 2-dimensional picture to show on the display unit 76.

Hereinafter, the method for manufacturing the ultrasonic-wave transmitter/receiver 10 is described.

Firstly, prepare the base material 22. Specifically, a resin plate-like member made of glass epoxy (FR-4) is cut into a circular shape. Then, prepare a ceramic plate-like member that is to be the piezoelectric element 23. Specifically, after producing a disk-shaped ceramic-sintered body made of lead-zirconate titanate (PZT), surface polishing is done to obtain a ceramic plate-like member. Next, form a front-surface-side electrode on the front surface 31 of the ceramic plate-like member, and form a rear-side electrode on the rear surface 32 of the ceramic plate-like member. Specifically, a silver paste is applied respectively to the front surface 31 and rear surface 32 of the ceramic plate-like member, and such applied silver paste is fired to form a front-surface-side electrode and a rear-surface-side electrode. Then, voltage is applied between the front-surface-side electrode and the rear-surface-side electrode, thus performing a polarization process to polarize the ceramic plate-like member in the thickness direction.

Next, join a ceramic plate-like member to one surface of the base material 22 via the front-surface-side electrode. Specifically, an adhesive (e.g. an epoxy adhesive or the like), to be an adhesive layer, is applied either to the surface of the front-surface-side electrode or the surface of the base material 22 to firmly bond the ceramic plate-like member to the base material 22. Instead of applying such an adhesive, it is also possible to braze, using solder or the like.

Next, a plurality of cuts K1 are formed on the rear surface 32 of the ceramic plate-like member by a cutting work or the like, so that the ceramic plate-like member is divided into a plurality of oscillating parts 33, and that the rear-surface-side electrode formed on the rear surface 32 of the ceramic plate-like member is also divided into a plurality (the same number as the oscillating part 33). At this point, the piezoelectric element 23 is completed. Since each oscillating part 33 is divided at the end of the front surface 31 of the piezoelectric element 23 in a state of being connected to each other, the front-surface-side electrode formed on the front surface 31 is not possibly divided. After that, a copper foil 34 is attached to the whole rear surface 32 of the piezoelectric element 23. The copper foil 34 is to be used as a common electrode on the tip surface of each oscillating part 33. At this point, the ultrasonic transducer 41 is completed.

After the ultrasonic transducer 21 is completed, the first wiring 41 is connected to the front-surface-side electrode via a side-surface terminal (not shown in the drawings) by soldering or the like, and the second wiring 42 is connected to the copper foil 34 by soldering or the like. Next, an acoustic insulator 43 for reducing reverberation is attached to the rear surface 32 of the piezoelectric element 23. Furthermore, while the first wiring 41 is joined to the cable 40 by soldering, the second wiring 42 is also joined to the cable 40 by soldering. Then, each joint is covered by a shrinkage tube for the purpose of insulation.

Then, the ultrasonic transducer 21 is housed in the lower case 51. Since the inner wall of the lower case 51 has a shape of which the inner diameter gradually decreases toward the bottom 54, the ultrasonic transducer 21 is held in a horizontal state by contact with the inner wall, thus being guided into the center position of the lower case 51. Then, the ultrasonic transducer 21 is bonded to the lower case 51 in a state in which the ultrasonic transducer 21 is arranged such that the amount of deviation between the central axis O3 of the lower case 51 and the central axis O2 of the base material 22 is 2% or less of the outer-diameter dimension of the lower case 51. Specifically, an adhesive (epoxy adhesive or the like) is applied either to the inner surface 54a of the lower case 51 or to the rear surface of the base material 22, thus firmly bonding the ultrasonic transducer 21 to the lower case 51.

Further, the filler A1 is filled into the case 50. Specifically, first, the bushing 63 is fitted into the through-hole 62 of the upper case 61. Then, the cable 40 is inserted into the cable-insertion hole 82 of the weight 81. Since the base end of the concave part 86 communicates with the cable-insertion hole 82, and the tip of the concave part 86 communicates with the positioning-concave part 84, the cable 40 can be inserted into the cable-insertion hole 82 from the side of the weight 81 via the concave part 86. After that, the wirings 41 and 42 are arranged in the concave part 86 of the weight 81, thus firmly fastening the wirings 41 and 42 with a tape (not shown in the drawings) or the like. Next, with the upper case 61, which is turned upside down, the cable 40 is inserted into the wiring-insertion hole 64 of the bushing 63, and then the weight 81 is housed in the opening of the upper case 61. At this time, the outer-peripheral surface 83 of the weight 81 contacts the inner-peripheral surface 65 of the upper case 61, so that a space is made below the weight 81 within the upper case 61. Also, to prevent the cable 40 from coming off, a knot can be provided at a position between the weight 81 and the bushing 63 in the cable 40, or a banding band can be fastened thereat.

Next, the liquid type of filler A1 is poured into the upper case 61 from the cable-insertion hole 82. Further, in a state in which the lower case 51 is turned upside down, the lower case 51 is covered and fitted onto the upper case 61 to form the case 50. Also, it is possible, for reinforcement, to apply in advance an adhesive (not shown in the drawings) to the contact region between the upper case 61 and the lower case 51. Then, before the filler A1 that has been filled into the upper case 61 is cured, the case 50 is turned upside down, and the bottom surface 52 of the lower case 51 is directed downward, thus placing the case 50 onto a horizontal flat surface (not shown in the drawings). As a result, the filler A1 in the upper case 61 passes through the cable-insertion hole 82 to flow into the lower case 51. As such, the cavity A2 is made in the upper region of the upper case 61. Further, since the filler A1 spreads from the upper surface 87 of the weight 81 to the inner surface 54a (bottom surface) of the lower case 51, the joint area between the upper case 61 and the lower case 51 is covered with the filler A1, thus securing the sealed state of the case 50. Also, a part of the filler A1 is filled into the void spaces (cut K1) between the oscillating parts 33 adjacent to each other in the piezoelectric element 23. Then, the weight 81 moves (drops) to the lower case 51, while being guided by the case 50 and by the cable 40, and is placed onto the acoustic insulator 43. At this time, the amount of deviation between the central axis O5 of the weight 81 and the central axis O1 of the piezoelectric element 23 is 2% or less of the outer-diameter dimension of the piezoelectric element 23.

Then, the case 50 is left to stand until the filler A1 is cured. Heat treatment is done according to the type of the filler A1 to cure the filler A1. At this point, the ultrasonic-wave transmitter/receiver 10 is completed.

Therefore, the embodiment of this invention realizes the following effects.

(1) According to the ultrasonic-wave transmitter/receiver 10 as the embodiment of this invention, the weight 81 is placed onto the upper side of the ultrasonic transducer 21 inside the case 50 to make the ultrasonic-wave transmitter/receiver 10 moderately heavy and thus harder to swing while being suspended by the cable 40, thus keeping the ultrasonic-wave transmitter/receiver 10 in the water balanced. In addition, the filler A1 is not filled into the entire case 50 but is filled so as to secure a cavity A2 at the upper region inside the case 50, so that the center of gravity of the ultrasonic-wave transmitter/receiver 10 can be lowered, thus stabilizing the balanced state of the ultrasonic-wave transmitter/receiver 10 in the water. As a result, the acoustic-radiation surface (specifically, the front surface 31 of the piezoelectric element 23) of the ultrasonic transducer 21 becomes horizontal, and the ultrasonic waves can be transmitted vertically downward, thus making it possible to improve the detection accuracy of the ultrasonic-wave transmitter/receiver 10.

(2) According to the embodiment of this invention, since the height of the weight 81 is half or less than the maximum diameter of the weight 81, the weight 81 is of a considerably flat shape. As a result, the space generated above the weight 81 in the case 50 becomes larger, that making the weight 81 lighter, thus making it easier to lower the center of gravity of the ultrasonic-wave transmitter/receiver 10.

(3) According to the embodiment of this invention, the concave part 86 radially extends from the center C1 of the weight 81, and the concave part 86 is arranged at an equal angular interval with reference to the center C1 of the weight 81. In other words, since the weight 81 as the embodiment of this invention has rotational symmetry, the center of gravity of the weight 81 is aligned with the center C1 of the weight 81. As a result, the weight 81 is less likely to tilt, thus making it possible more to stabilize the balanced state of the ultrasonic-wave transmitter/receiver 10 in the water.

(4) Also, according to the embodiment of this invention, an even number (four) of the concave parts 86 are formed in the weight 81, and each concave part 86 is arranged at an equal angular interval with reference to the center C1. Thus, of all the concave parts 86, the prescribed concave part 86a, and the concave part 86b on the opposite side of the concave part 86a, via the center C1, are aligned in a straight line (see FIG. 8). In this case, since the arrangement of the concave 86 is rotationally symmetric, the center of gravity of the weight 81 is on the central axis O5, thus making it more reliably possible to stabilize the balanced state of the ultrasonic-wave transmitter/receiver 10 in the water.

(5) According to the embodiment of this invention, the amount of deviation between the central axis O1 of the piezoelectric element 23 and the central axis O2 of the base material 22 is 0%, and the amount of deviation between the central axis O1 and the central axis O5 of the weight 81 is 0%, and the amount of deviation between the central axis O2 and the central axis O3 of the lower case 51 is 0%. That is, each amount of deviation at the central axes O1 to O3 and O5 is kept low, thus making it reliably possible to adjust the center of gravity of the ultrasonic-wave transmitter/receiver 10.

(6) According to the embodiment of this invention, filling the filler A1 into the plurality of cuts K1 reinforces each of the plurality of oscillating parts 33 arranged in the piezoelectric element 23 via the cuts K1, thus making it possible to prevent the oscillating parts 33 from being cracked. As a result, the reliability of the ultrasonic transducer 21 is improved.

Also, each embodiment of this invention can be modified, as follows.

Figure 10:
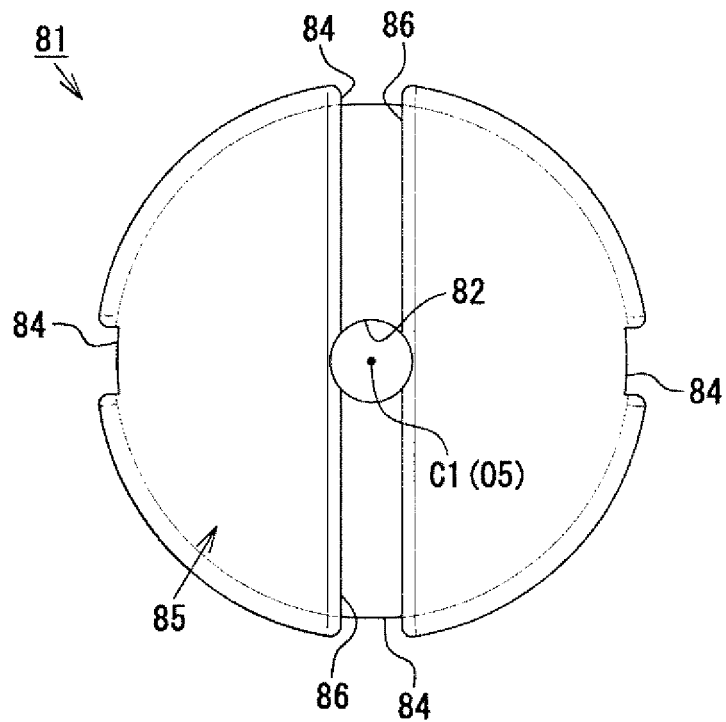
FIG. 10 is a bottom view of the weight according to another embodiment of this invention.

According to the above embodiment, the bottom surface 85 of the weight 81 is formed with the four concave parts 86 extending from the center C1 to the outer-peripheral side. However, the number of concave parts 86 may be five or more or three or less (e.g. two in FIG. 10). Also, the concave parts 86 need not extend from the center C1 to the outer-peripheral side. For example, they may be arranged between the center C1 of the weight 81 and the outer-peripheral part of the weight 81 and have a circular shape in the planner view or a rectangular shape in the planner view, or the like.

According to the above embodiment, four positioning-concave parts 84 are formed on the outer-peripheral surface 83 of the weight 81, and four positioning-convex parts 66 are provided on the inner-peripheral surface 65 of the upper case 61. However, the number of positioning-concave parts 84 and positioning-convex parts 66 may be five or more or three or less. To the contrary, neither the positioning-concave portion 84 nor the positioning-convex portion 66 need be provided.

Figure 11A:
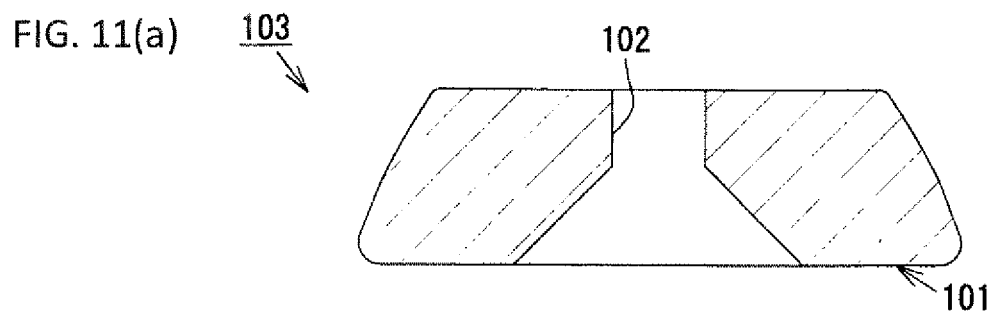
FIGS. 11(a) to 11(c) are views of the weight according to another embodiment.
Figure 11B:
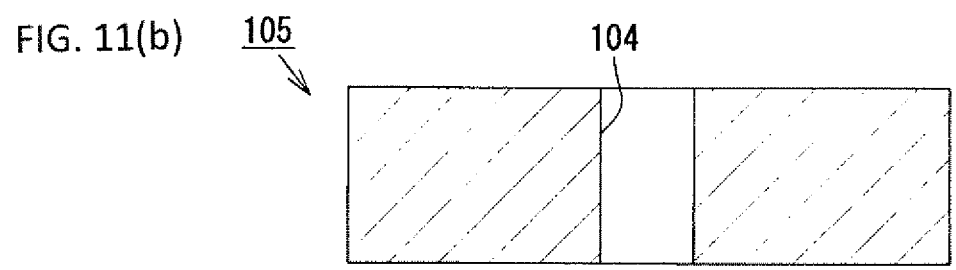
Figure 11C:
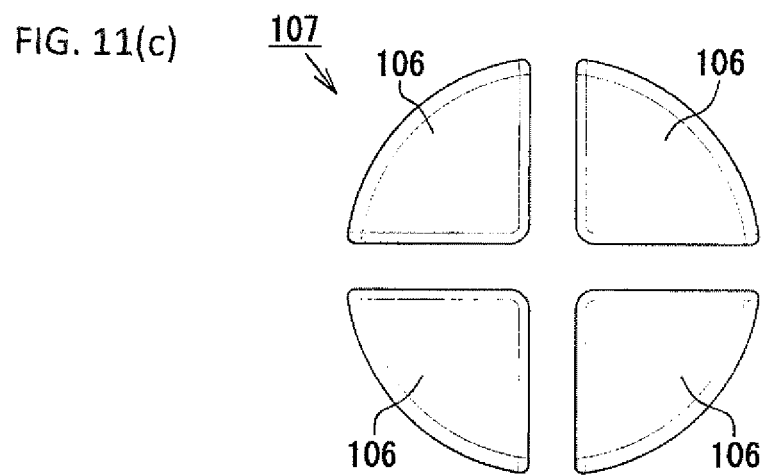

According to the above embodiment, the weight 81 of a substantially truncated-cone shape having the cable-insertion hole 82 in the center is used. However, a weight of another shape may be used. For example, as shown in FIG. 11(a), it is possible to use a weight 103 having a cable-insertion hole 102 whose inner diameter gradually increases toward the bottom surface 101. As such, when the lower case 51 is fitted into the upper case 61, the excess part of the cable 40 can be accommodated in the opening space of the bottom surface 101 of the cable-insertion hole 102. As shown in FIG. 11(b), it is also possible to use a substantially disc-shaped weight 105 having a cable-insertion hole 104 at the center. It is further possible to use a weight 107 (see FIG. 11(c) made of a plurality of weight parts 106 divided from each other. Furthermore, it is possible to use a granular type of weight (lead ball) that is housed in the case 50 such that a space is secured in the upper region of the case 50.

Figure 13:
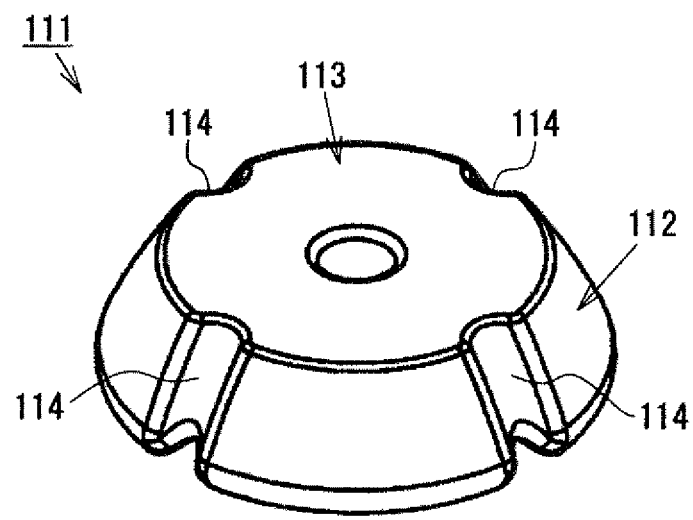
FIG. 13 is a perspective view of the weight according to another embodiment.
Figure 14:
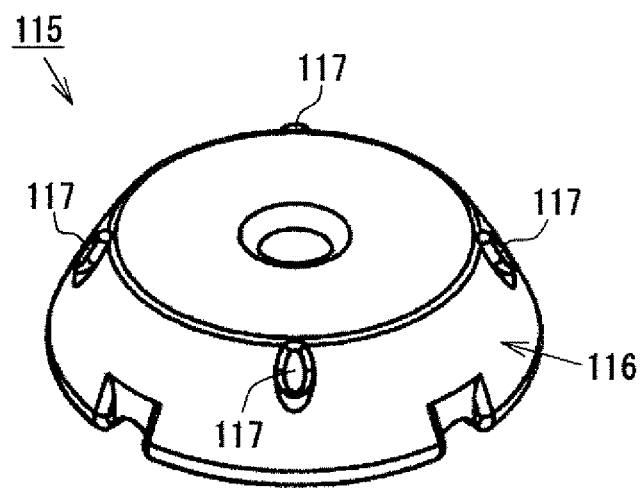
FIG. 14 is a perspective view of the weight according to another embodiment.
Figure 15:
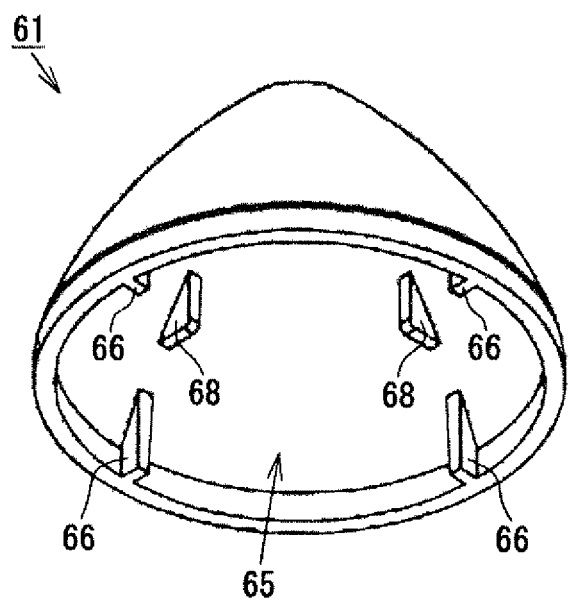
FIG. 15 is a perspective view of the upper case according to another embodiment.

According to the above embodiment, in a state in which the upper case 61 that is housing the weight 81 is turned upside down, the liquid type of filler A1 is poured into the upper case 61 from the cable-insertion hole 82. However, to shorten the time of inserting the filler A1 into the case 61, it is possible to provide a clearance between the upper case 61 and the weight, so that air is released from the upper case 61. For example, as shown in FIG. 13, a plurality of (e.g. four for this embodiment) grooves 114 that connect the bottom surface and the upper surface 113 of the weight 111 may be formed on the outer-peripheral surface 112 (inclined surface) of the weight 111, so that air can be released from the upper case 61 via each groove 114. Also, as shown in FIG. 14, a plurality of (e.g. four for this embodiment) protrusions 117 may be provided on the outer-peripheral surface 116 of the weight 115, and when the weight 115 is housed in the upper case 61, the tip-surface of each protrusion 117 is contacted with the inner-peripheral surface 65 of the upper case 61, thus making a clearance between the upper case 61 and the weight 115 to release the air. Furthermore, as shown in FIG. 15, a plurality of protrusions 68 may be provided above the positioning-convex part 66 on the inner-peripheral surface 65 of the upper case 61, and when the weight 81 is housed in the upper case 61, the tip-surface of each protrusion 68 is contacted with the outer-peripheral surface 83 of the weight 81, thus making a clearance between the upper case 61 and the weight 81 to release the air. Alternatively, a member (spacer) may be inserted between the inner-peripheral surface 65 of the upper case 61 and the outer-peripheral surface 83 of the weight 81, thus making a clearance to release the air.

According to the embodiment of this invention, the case 50 is configured by joining the upper case 61 to the lower case 51. However, the case can also be integrally formed.

According to the above embodiment of this invention, the upper case 61 and the lower case 51 are joined by fitting the lower end of the upper case 61 into the lower case 51 from the upper-end-side opening of the lower case 51. However, it is also possible to join them in another way. For example, the upper case 61 and the lower case 51 may be joined by curing the filler A1 that has been filled into the case 50. In addition, it is also possible to join the upper case 61 to the lower case 51 by inserting a screw into a screw insertion hole provided on the upper case 61 (or lower case 51) and then screwing the tip of the inserted screw into the lower case 51 (or upper case 61). Furthermore, it is possible to join the upper case 61 to the lower case 51 by using an adhesive.

According to the above embodiment of this invention, buoyancy materials made of a material of a lesser specific gravity than that of the filler A1, such as styrene foam, air cap and styrene beads, can be filled into the cavity A2 left in the upper region of the case 50 after filling the filler A1. As such, the ultrasonic-wave transmitter/receiver 10 is then provided with buoyancy, thus making it possible to stabilize the balanced state of the ultrasonic-wave transmitter/receiver 10 in the water.

According to the ultrasonic transducer 21 as the embodiment of this invention, the outer surface of the piezoelectric element 23 is covered with the filler A1, and the filler A1 is filled into a plurality of the cuts K1 formed on the piezoelectric element 23. However, such cuts K1 can be a void space. In this case, the filler A1 is not filled into the cuts K1 to avoid the hindrance of deformation in the thickness direction of the plurality of oscillating parts 33 arranged via the cuts K1. As a result, it is possible to prevent sensitivity reduction of the ultrasonic transducer 21 caused by the filling of the filler A1. As a method for making each cut K1 a void space, it is possible to wind a tape (not shown in the drawings) or a sponge (not shown in the drawings) around the outer-peripheral surface of the piezoelectric element 23 or to fill both ends of each cut K1 with a filling resin or the like, thus making it possible to prevent the filler A1 from entering the cuts K1.

Figure 12:
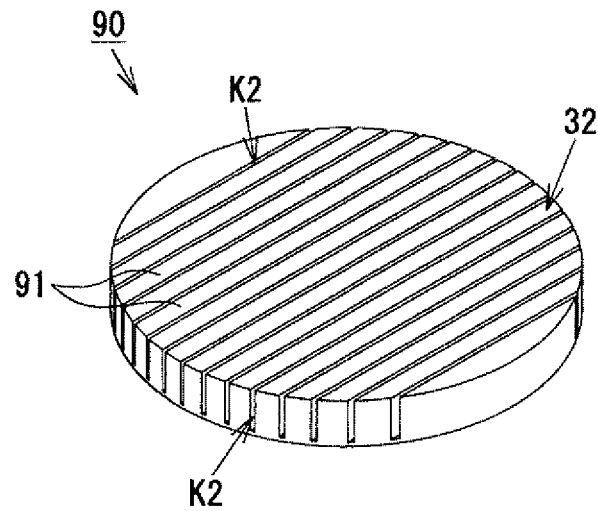
FIG. 12 is a perspective view of the piezoelectric element according to another embodiment.

The ultrasonic transducer 21 as the above embodiment of this invention includes the piezoelectric element 23 having a structure divided into a plurality of columnar-oscillating parts 33 by forming the cuts K1 extending vertically and horizontally. However, as shown in FIG. 12, the ultrasonic transducer 21 may also include the piezoelectric element 90 having a structure divided into a plurality of strip-shaped oscillating parts 91 by making a cut K2 extending in one direction. As such, the number of times of making the cuts K2 necessary to form the oscillating part 91 will be half as much compared to the case in which the columnar-oscillating part 33 is obtained by making the cuts K1 extending vertically and horizontally. That makes it easy to form the cuts K2, thus eventually reducing the cost of manufacturing the ultrasonic transducer 21. Also, since the oscillating part 91 is strip-shaped, the oscillating part 91 becomes longer in the planner direction than the columnar-oscillating part 33. As a result, the strength of the oscillating part 91 is increased, thus improving the reliability of the ultrasonic transducer 21. Further, the ultrasonic transducer 21 may comprise a disk-shaped piezoelectric element without a cut K1 or may comprise an annular or rectangular piezoelectric element. Furthermore, it is also possible to use a piezoelectric element having a 0-3 composite structure formed by mixing piezoelectric ceramic particles with a rubber material or a piezoelectric element made of porous piezoelectric ceramics (e.g. porous element), or the like.

According to the above embodiment of this invention, the base material 22 that functions as an acoustic-matching layer is inserted between the piezoelectric element 23 and the lower case 51. However, the base material 22 may be omitted, since the lower case 51 also functions as an acoustic-matching layer. Further, the base material 22 is not necessarily limited to one kind of material but can be of a multi-layer-matching layer formed by laminating together different types of materials.

According to the above embodiment of this invention, the base material 22 that functions as the acoustic-matching layer is bonded to the piezoelectric element 23 and to the lower case 51. However, it is possible to omit the base material 22 and to arrange the spacer to make a clearance so that a constant distance is made between the lower case 51 and the piezoelectric element 23. Then, the filler is poured into the clearance and cured, thus forming the acoustic-matching layer.

According to the above embodiment of this invention, the groove 57 is formed on the outer peripheral surface 53 of the side wall 55 of the lower case 51. However, the groove 57 need not be provided.

Besides the technical ideas described about this invention, other technical ideas to be understood about the described embodiments, above, are hereinafter described.

(1) An ultrasonic-wave transmitter/receiver according to any one of the first to twelfth aspects of this invention, characterized in that the thickness of the weight is less than the outer diameter of the weight and less than the height of the cavity.

(2) An ultrasonic-wave transmitter/receiver according to the eleventh or twelfth aspect of this invention, characterized in that the ultrasonic transducer comprises: a base material that functions also as an acoustic-matching layer; and a piezoelectric element joined to the base material, wherein the amount of deviation between the central axis of the piezoelectric element and the central axis of the base material is 2% or less of the outer-diameter dimension of the base material.

(3) An ultrasonic-wave transmitter/receiver according to the eleventh or twelfth aspect of this invention, characterized in that the ultrasonic transducer comprises: a base material that functions also as an acoustic-matching layer; and a piezoelectric element joined to the base material, wherein the case is configured with an upper case that opens at the lower end and with a lower case that opens at the upper end, therein the amount of deviation between the central axis of the lower case and the central axis of the base material is 2% or less of the outer-diameter dimension of the lower case.

(4) An ultrasonic-wave transmitter/receiver according to the eleventh or twelfth aspect of this invention, characterized in that the amount of deviation between the central axis of the weight and the central axis of the piezoelectric element is 2% or less of the outer-diameter dimension of the piezoelectric element.

(5) An ultrasonic-wave transmitter/receiver according to any one of the first to twelfth aspects of this invention, characterized in that the weight comprises: a cable-insertion hole through which the cable is inserted at the center; and a concave part on the bottom surface, in which concave part wiring included in the cable can be arranged, and whereon such bottom surface the concave part communicates with the cable-insertion hole.

DESCRIPTION OF THE REFERENCE NUMERALS

10: Ultrasonic-wave transmitter/receiver
21: Ultrasonic transducer
21a: Upper surface of the ultrasonic transducer
23, 90: Piezoelectric element
32: Rear surface as the main surface of the piezoelectric element
40: Cable
41: First wiring as the wiring
42: Second wiring as the wiring
50: Case
51: Lower case
54: Bottom of the lower case
55: Side wall of the lower case
58: Inner wall of the lower case
61: Upper case
61a: Lower end of the upper case
65: Inner-peripheral surface of the upper case
66: Positioning-convex part
67: Top of the inner wall of the upper case
81, 103, 105, 107, 111, 115: Weight
82, 102, 104: Cable-insertion hole
83, 112, 116: Outer-peripheral surface of the weight
84: Positioning-concave part
85, 101: Bottom surface of the weight
86, 86a, 86b: Concave part
A1: Filler
A2: Cavity
A3: Upper-end surface of the filler
C1: Center of the weight
K1, K2: Cut

The invention claimed is:

1. An ultrasonic-wave transmitter/receiver for a fishfinder, comprising:
   an ultrasonic transducer for transmitting and receiving ultrasonic waves;
   a hanging-bell shaped case securing a sealed state for housing such ultrasonic transducer;
   a cable for suspending the case;
   a weight placed on an upper side of the ultrasonic transducer that is located at a bottom inside the case, wherein the weight has a substantially truncated-cone shape and includes a cable-insertion hole for receiving the cable at a center of the weight; and
   the case further comprising:
   i) an upper case that is open at a lower end thereof, with an outer diameter being gradually reduced toward an upper end thereof, the upper case having a wiring insertion hole at the upper end through which the cable is pulled out; and
   ii) a lower case that is open at an upper end thereof, with a bottom and side wall integrally formed into a concave cross-section;
   a filler, the filler filling a void space between:
   a) an outer peripheral surface of the weight and an inner wall of the upper case,
   b) a bottom surface of the weight and an upper surface of the ultrasonic transducer,
   c) the cable and the cable insertion hole, and
   d) an outer peripheral surface of the ultrasonic transducer and an inner wall of the lower case,
   the case filled so as to leave a cavity in an area above an upper surface of the weight, a thickness of the weight being smaller than a dimension in a height direction of the cavity, and
   the filler being a liquid type of a filler that is cured with adhesive properties.

2. An ultrasonic-wave transmitter/receiver according to claim 1, characterized in that a concave part, on which wiring included in the cable can be arranged, is formed on the bottom surface of the weight.

3. An ultrasonic-wave transmitter/receiver according to claim 2, characterized in that a plurality of concave parts radially extend from the center of the weight.

4. An ultrasonic-wave transmitter/receiver according to claim 2, characterized in that the wiring is arranged in the concave part, and that the filler is filled into the concave part in which the wiring is arranged.

5. An ultrasonic-wave transmitter/receiver according to claim 1, characterized in that an upper-end surface of the filler is located at a height of half or less of a height of an upper surface of the ultrasonic transducer to a top of the inner wall of the upper case.

6. An ultrasonic-wave transmitter/receiver according to claim 1, characterized in that a positioning-concave part, extending in a thickness direction of the weight, is formed on the outer-peripheral surface of the weight, and a positioning-convex part is provided on the inner wall of the upper case so as to be fitted with the positioning-concave part, and that the filler is filled into the clearance between the positioning-concave part and the positioning-convex part.

7. An ultrasonic-wave transmitter/receiver according to claim 1, characterized in that the inner wall of the lower case has a shape of which an inner diameter gradually decreases toward the bottom of the lower case, and therein the ultrasonic transducer that makes contact with the inner wall is guided to a center position of the lower case, thus being disposed on the bottom of the lower case.

8. An ultrasonic-wave transmitter/receiver according to claim 1, characterized in that the ultrasonic transducer comprises a piezoelectric element having a plurality of cuts formed on a main-surface side thereof, with an outer surface of the piezoelectric element being covered with the filler, and therein piezoelectric element the filler is filled into the plurality of cuts.

9. An ultrasonic-wave transmitter/receiver according to claim 1, characterized in that the ultrasonic transducer comprises a piezoelectric element having a plurality of cuts formed on a main-surface side therein, the outer surface of the piezoelectric element is covered with the filler, while the plurality of cuts are void spaces.

* * * * *